United States Patent
Wan et al.

(10) Patent No.: US 10,506,544 B2
(45) Date of Patent: Dec. 10, 2019

(54) METHOD AND EQUIPMENT FOR DISTINGUISHING HOMONYMIC WIRELESS ACCESS POINTS

(71) Applicant: SHANGHAI LIANSHANG NETWORK TECHNOLOGY CO., LTD., Shanghai (CN)

(72) Inventors: Yuquan Wan, Shanghai (CN); Chengwei Bao, Shanghai (CN)

(73) Assignee: SHANGHAI LIANSHANG NETWORK TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 15/888,093

(22) Filed: Feb. 5, 2018

(65) Prior Publication Data
US 2018/0160392 A1 Jun. 7, 2018

Related U.S. Application Data (63) Continuation of application No. PCT/CN2016/070679, filed on Jan. 12, 2016.

(30) Foreign Application Priority Data

Aug. 10, 2015 (CN) .......................... 2015 1 0486358

(51) Int. Cl.
| | |
|---|---|
| *H04W 88/08* | (2009.01) |
| *H04W 64/00* | (2009.01) |
| *H04W 48/14* | (2009.01) |
| *H04W 48/16* | (2009.01) |

(52) U.S. Cl.
CPC .......... *H04W 64/003* (2013.01); *H04W 48/14* (2013.01); *H04W 48/16* (2013.01); *H04W 88/08* (2013.01)

(58) Field of Classification Search
CPC ... H04W 64/003; H04W 88/08; H04W 48/14; H04W 48/16; H04W 64/00
See application file for complete search history.

(56) References Cited

U.S. PATENT DOCUMENTS

| | | | | |
|---|---|---|---|---|
| 2008/0076420 A1* | 3/2008 | Khetawat | ................ | H04W 8/04 455/435.1 |
| 2009/0279518 A1* | 11/2009 | Falk | ...................... | H04W 76/18 370/338 |
| 2010/0232409 A1* | 9/2010 | Kim | ...................... | H04L 63/101 370/338 |
| 2012/0196639 A1* | 8/2012 | Takeda | .................. | H04W 48/16 455/515 |
| 2013/0097710 A1* | 4/2013 | Basavapatna | ........... | H04W 4/02 726/25 |

(Continued)

*Primary Examiner* — Chi Ho A Lee
*Assistant Examiner* — Andrew Lee
(74) *Attorney, Agent, or Firm* — Gokalp Bayramoglu (57) ABSTRACT

The purpose of the present application is to provide a method and equipment for distinguishing homonymic wireless access points through comparing the access point assistant information of the first wireless access point and the second wireless access point which are homonymic, including using the position information, the adjacent base station information, or the adjacent access point information, etc. of the wireless access point. The homonymic wireless access points are further distinguished. Thus, the information of wireless access point is accurately described.

5 Claims, 8 Drawing Sheets

(56) References Cited

U.S. PATENT DOCUMENTS

| | | | | |
|---|---|---|---|---|
| 2014/0181515 A1* | 6/2014 | Yang | ............... | H04W 12/06 |
| | | | | 713/168 |
| 2015/0256546 A1* | 9/2015 | Zhu | ............... | H04W 12/08 |
| | | | | 726/4 |
| 2016/0335497 A1* | 11/2016 | Williams | ........... | G06K 9/00671 |
| 2016/0338085 A1* | 11/2016 | Wu | ............... | H04W 72/0446 |
| 2017/0201930 A1* | 7/2017 | Chen | ............... | H04W 8/26 |
| 2017/0372055 A1* | 12/2017 | Robinson | ........... | H04W 12/06 |
| 2018/0007516 A1* | 1/2018 | Ge | ............... | H04W 64/00 |

\* cited by examiner

Figure 6 network device 1'                                    user device 2

Step S25: sending the query request regarding the first wireless access point to the network device, wherein the query request includes the wireless access point identifying information and the access point assistant information of the first wireless access point Step S11': conducting the matching based on the query request Step S12': If a plurality of second wireless access points having the same wireless access point identifying information as that of the first wireless access point is obtained, whether the first wireless access point and the second wireless access point are the same is determined according to the access point assistant information of the first wireless access point and the second wireless access point Step S13': providing the second wireless access point which is the same as the first wireless access point to the user device 2

Step S26: obtaining the second wireless access point which is the same as the first wireless access point

METHOD AND EQUIPMENT FOR DISTINGUISHING HOMONYMIC WIRELESS ACCESS POINTS

CROSS REFERENCE TO RELATED APPLICATIONS

This application is a continuation application of International Application No. PCT/CN2016/070679, filed on Jan. 12, 2016, which is based upon and claims priority to Chinese Patent Application No. 201510486358.4, filed on Aug. 10, 2015, the entire contents of which are incorporated herein by reference.

TECHNICAL FIELD

The present application relates to the field of computers, particularly to a technology for distinguishing homonymic wireless access points.

BACKGROUND

Regarding the fact that wireless access points (hotspots) have a variety of identifying information. Usually, Service Set Identifier (SSID) and Media Access Control address (MAC address) are used to determine whether the wireless access points are the same.

Since the name of the MAC address of the router lacks standardization, there may be case of duplication of names. Meanwhile, the name of SSID also may be the same. Both SSID and MAC addresses of different wireless access points may be the same. Usually, wireless access points having the same SSID and MAC addresses are referred as homonymic wireless access points. When the user device (mobile terminal) is identifying the hot spot, generally, only SSID and MAC addresses are determined. A plurality of homonymic wireless access points may cause the network device (cloud end) unable to uniquely identify a certain wireless access point. As a result, a series of problems occur when the network device is conducting hot spot data matching (for example, the hotspot password, the hot spot merchant, etc.

SUMMARY OF THE INVENTION

One purpose of the present application is to provide a method and a device for distinguishing homonymic hotspots using the access point assistant information collected by the terminal in assistance, for example, the position information, the adjacent base station information, or the surrounding hot spot information, etc. Thus, the information of the access point is accurately described.

In order to achieve the above purpose, the present application provides a method for distinguishing homonymic wireless access points at the network device end, wherein the method includes:

obtaining a plurality of second wireless access points having the same wireless access point identifying information as that of the first wireless access point; and determining whether the first wireless access point and the second wireless access point are the same according to the access point assistant information of the first wireless access point and the second wireless access point.

Furthermore, the access point assistant information includes at least one item selected from the group consisting of:

the position information of the wireless access point;

the adjacent access point information of the wireless access point; and the adjacent base station information of the wireless access point.

Furthermore, the access point assistant information includes the position information of the wireless access point or the adjacent base station information of the wireless access point;

wherein the step of determining whether the first wireless access point and the second wireless access point are the same according to the access point assistant information of the first wireless access point and the second wireless access point includes:

when the first wireless access point and the second wireless access point have the same position information or adjacent base station information, determining that the first wireless access point and the second wireless access point are the same.

Furthermore, the access point assistant information includes the adjacent access point information of the wireless access point;

wherein the step of determining whether the first wireless access point and the second wireless access point are the same according to the access point assistant information of the first wireless access point and the second wireless access point includes:

when the matching information of the adjacent access point information of the first wireless access point and the adjacent access point information of the second wireless access point is equal to or more than agreed matching threshold information, determining that the first wireless access point and the second wireless access point are the same.

Furthermore, obtaining a plurality of second wireless access points having the same wireless access point identifying information as that of the first wireless access point includes:

obtaining the query request regarding the first wireless access point from the user device;

based on the query request, obtaining a plurality of second wireless access points having the same wireless access point identifying information as that of the first wireless access point.

The method further includes:

providing the second wireless access point which is the same as the first wireless access point to the user device.

Furthermore, the method further includes:

obtaining the access point assistant information of the first wireless access point from the user device.

Furthermore, the wireless access point identifying information includes:

Service Set Identifier (SSID) and/or Media Access Control address (MAC) of the wireless access point.

The present application further provides a method for distinguishing homonymic wireless access points at the user device end, wherein the method includes:

sending the query request regarding the first wireless access point to the network device, the query request includes the wireless access point identifying information and the access point assistant information of the first wireless access point;

obtaining the second wireless access point which is the same as the first wireless access point, and is determined based on the wireless access point identifying information and the access point assistant information, and is sent by the network device.

The present application further provides a method for distinguishing homonymic wireless access points at the user device end, wherein the method includes:

sending the query request regarding the first wireless access point to the network device, wherein the query request includes the wireless access point identifying information of the first wireless access point;

based on the obtainment of information of a plurality of second wireless access points having the same wireless access point identifying information as that of the first wireless access point by the network device, sending the wireless access point identifying information of the first wireless access point to the network device;

obtaining the second wireless access point which is the same as the first wireless access point, and is determined based on the wireless access point identifying information and the access point assistant information, and is sent by the network device.

The present application further provides a network device for distinguishing homonymic wireless access points, wherein the network device includes:

a first apparatus, which is used to obtain a plurality of second wireless access points having the same wireless access point identifying information as that of the first wireless access point;

a second apparatus, which is used to determine whether the first wireless access point and the second wireless access point are the same according to the access point assistant information of the first wireless access point and the second wireless access point.

Furthermore, the access point assistant information includes at least one item selected from the group consisting of:

the position information of the wireless access point;

the adjacent access point information of the wireless access point; and the adjacent base station information of the wireless access point.

Furthermore, the access point assistant information includes the position information of the wireless access point or the adjacent base station information of the wireless access point;

wherein the second apparatus is configured to include:

when the first wireless access point and the second wireless access point have the same position information or adjacent base station information, determining that the first wireless access point and the second wireless access point are the same.

Furthermore, the access point assistant information includes the adjacent access point information of the wireless access point;

wherein the second apparatus is configured to include:

when the matching information of the adjacent access point information of the first wireless access point and the adjacent access point information of the second wireless access point is equal to or more than agreed matching threshold information, determining that the first wireless access point and the second wireless access point are the same.

Furthermore, the first apparatus is configured to include:

obtaining the query request regarding the first wireless access point from the user device;

obtaining based on the query request, a plurality of second wireless access points having the same wireless access point identifying information as that of the first wireless access point;

the network device further includes:

a third apparatus, which is used to provide the second wireless access point which is the same as the first wireless access point to the user device.

Furthermore, the network device further includes:

a fourth apparatus, which is used to obtain the access point assistant information of the first wireless access point from the user device.

Furthermore, the wireless access point identifying information includes:

Service Set Identifier (SSID) and/or Media Access Control address (MAC) of the wireless access point.

The present application further provides a user device for distinguishing homonymic wireless access points, wherein the user device includes:

a fifth apparatus, which is used to send the query request regarding the first wireless access point to the network device, wherein the query request includes the wireless access point identifying information and the access point assistant information of the first wireless access point;

a sixth apparatus, which is used to obtain the second wireless access point which is the same as the first wireless access point, and is determined based on the wireless access point identifying information and the access point assistant information, and is sent by the network device.

The present application further provides a user device for distinguishing homonymic wireless access points, wherein the user device includes:

a seventh apparatus, which is used to send the query request regarding the first wireless access point to the network device, wherein the query request includes the wireless access point identifying information of the first wireless access point;

an eighth apparatus, which is used to send the access point assistant information of the first wireless access point to the network device based on the obtainment of information of a plurality of second wireless access points having the same wireless access point identifying information as that of the first wireless access point by the network device;

a ninth apparatus, which is used to obtain the second wireless access point which is the same as the first wireless access point, and is determined based on the wireless access point identifying information and the access point assistant information, and is sent by the network device.

The present application further provides a system for distinguishing homonymic wireless access points, wherein the system includes the above network device and the above user device.

Compared with the prior art, the method and equipment of the present application compare the access point assistant information of the first wireless access point and the second wireless access point which are homonymic, so that the homonymic wireless access points are further distinguished. The access point assistant information includes the position information, the adjacent base station information, or the adjacent access point information, etc. of the wireless access point. Thus, the information of wireless access point is accurately described.

BRIEF DESCRIPTION OF TILE DRAWINGS

By reading the detailed description of the non-restrictive embodiments with reference to the following drawings, other characteristics, purposes, and advantages of the present application will become apparent.

In the drawings, the same or similar reference number represents the same or similar part.

DETAILED DESCRIPTION OF THE INVENTION

Hereinafter, the present application is further described in detail with reference to the drawings.

Figure 1:
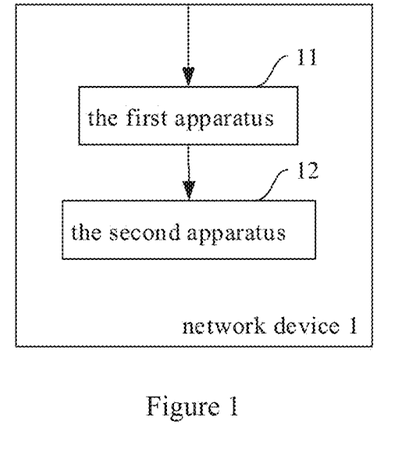
FIG. 1 shows a network device for distinguishing homonymic wireless access points provided according to one aspect of the present application.

FIG. 1 shows a network device for distinguishing homonymic wireless access points provided according to one aspect of the present application, wherein the network device 1 includes the first apparatus 11 and the second apparatus 12.

The first apparatus 11 is used to obtain a plurality of second wireless access points having the same wireless access point identifying information as that of the first wireless access point. The second apparatus 12 is used to determine whether the first wireless access point and the second wireless access point are the same according to the access point assistant information of the first wireless access point and the second wireless access point.

Here, in the present application, the network device 1 can be a network host, a single network server, a plurality of network server sets, or a cloud composed of a plurality of servers, etc. The cloud is composed of a great number of hosts or network servers based on cloud computing. The cloud computing is a kind of distributed computation and is a super virtual computer composed of a group of loosely coupled computer sets. A person of ordinary skill in the art should understand that the above network device 1 is only an example. Other network devices 3 existing currently or those occurring in the future, as long as can be applied in the present application, should also be included in the protective scope of the present application, which is included herein by reference. Further, the network device 3 includes an electronic device which can conduct numerical calculation and information processing automatically according to predetermined or stored instructions. The hardware of the electronic device includes but is not limited to a microprocessor, an application-specific integrated circuit (ASIC), a programmable gate array (FPGA), digital processing unit (DSP), an embedded device etc. Certainly, a person of ordinary skill in the art should understand that the above network device 1 is only an example. Other network devices 1 existing currently or those occurring in the future, as long as can be applied in the present application, should also be included in the protective scope of the present application, which is included herein by reference.

The first apparatus 11 at first obtains a plurality of second wireless access points having the same wireless access point identifying information as that of the first wireless access point. Here, the wireless access point identifying information includes the Service Set Identifier and/or the Media Access Control address of the wireless access point. The wireless access point identifying information may be obtained from network LAN (Local Area Network) service list of the user device. The specific obtaining manner can be the method which is well known by a person of ordinary skill in the art, and the details are not recited here.

Preferably, the access point assistant information includes at least one item selected from the group consisting of the position information of the wireless access point, the adjacent access point information of the wireless access point, and the adjacent base station information of the wireless access point.

Next, the second apparatus 12 determines whether the first wireless access point and the second wireless access point are the same according to the access point assistant information of the first wireless access point and the second wireless access point.

In an embodiment, the access point assistant information includes the position information of the wireless access point. The second apparatus 12 determines whether the first wireless access point and the second wireless access point have the same position information. When the first wireless access point and the second wireless access point have the same position information, the second apparatus 12 determines that the first wireless access point and the second wireless access point are the same. Here, if the obtained position information has errors, when the first wireless access point and the position information of the second wireless access point are within the allowed error range, the second apparatus 12 may determine that the first wireless access point and the second wireless access point are the same. Moreover, the error may be set specifically according to the actual precision of the device and different scenarios, and the details are not recited here.

In another embodiment, the access point assistant information includes the adjacent base station information of the wireless access point. The second apparatus 12 determines whether the first wireless access point and the second wireless access point have the same adjacent base station information. When the first wireless access point and the second wireless access point have the same adjacent base station information, the second apparatus 12 determines that the first wireless access point and the second wireless access point are the same.

In yet another embodiment, the access point assistant information includes the adjacent access point information of the wireless access point. When the matching information of the adjacent access point information of the first wireless access point and the adjacent access point information of the second wireless access point is equal to or more than the agreed matching threshold information, the second apparatus 12 determines that the first wireless access point and the second wireless access point are the same.

Figure 2:
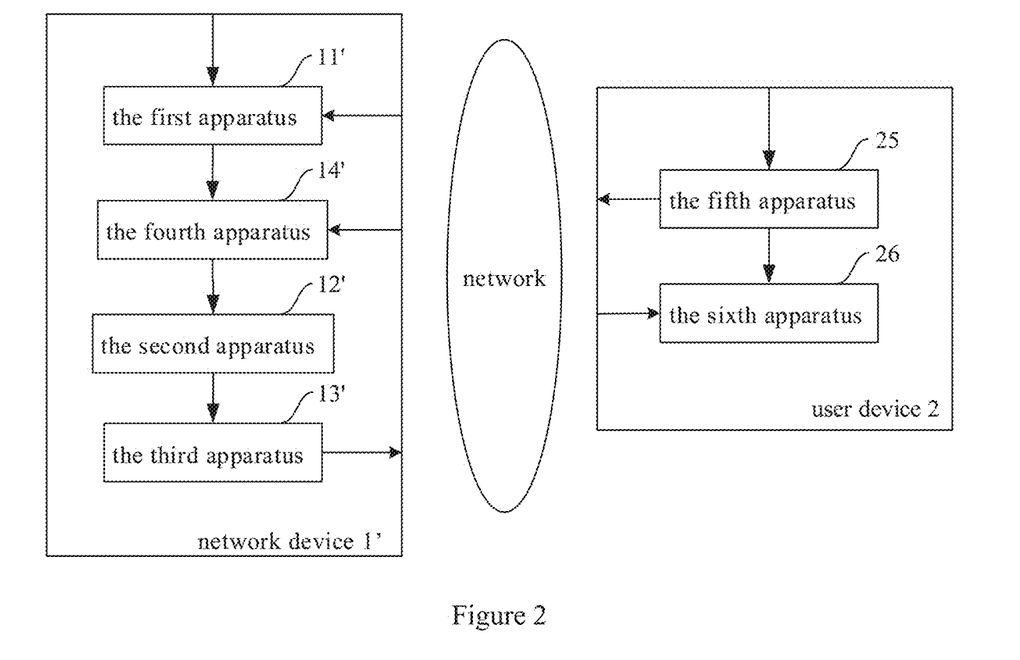
FIG. 2 shows a schematic diagram of the cooperation of a network device and a user device for distinguishing homonymic wireless access points provided according to one preferred embodiment of the present application.

FIG. 2 shows a structural schematic diagram of the cooperation of a network device and a user device for distinguishing homonymic wireless access points provided according to one preferred embodiment of the present application. The network device 1' includes the first apparatus 11', the second apparatus 12', the third apparatus 13', and the fourth apparatus 14'.

Here, the user device 2 includes but is not limited to an electronic device which can conduct numerical calculation and information processing automatically according to predetermined or stored instructions. The hardware of the electronic device includes but is not limited to a microprocessor, an application-specific integrated circuit (ASIC), a programmable gate array (FPGA), a digital processing unit (DSP), an embedded device etc. For example, the electronic device can be but is not limited to any mobile electronic product which can conduct the man-machine interaction with the user through a touch panel, for example, a smartphone, a PDA etc. The mobile electronic product may use any operating system, for example, Android operating system, iOS operating system etc. The user device 2 also may be a script program running on the above devices. Certainly, a person of ordinary skill in the art should understand that the above user device 2 is only an example. Other user devices 2 existing currently or those occurring in the future, as long as can be applied in the present application, should also be included in the protective scope of the present application, which is included herein by reference.

On the basis of the content of the first apparatus 11 of network device 1 shown in FIG. 1, the first apparatus 11' obtains the query request regarding the first wireless access point from user device 2. Based on the query request, a plurality of second wireless access points having the same wireless access point identifying information as that of the first wireless access point is obtained.

The fourth apparatus 14' is used to obtains the assistant information of the first wireless access point from the user device The content of the second apparatus 12' is the same or substantially the same as that of the first apparatus 12 of network device 1 shown in FIG. 1. for the sake of simplicity, the details are not recited here, which is included herein merely by reference.

The third apparatus 13' is used to provide the second wireless access point which is the same as the first wireless access point to the user device 2.

Then referring to FIG. 2, the user device 2 includes the fifth apparatus 25 and the sixth apparatus 26.

The fifth apparatus 25 is used to send the query request regarding the first wireless access point to network device 1', the query request includes the wireless access point identifying information and the access point assistant information of the first wireless access point. The sixth apparatus 26 is used to obtain the second wireless access point which is the same as the first wireless access point, and is determined based on the wireless access point identifying information and the access point assistant information, and is sent by the network device 1'.

With reference to FIG. 2, the procedure of the cooperative working of the network device 1' and the user device 2 is as below:

The fifth apparatus 25 of the user device 2 sends the query request regarding the first wireless access point to network device 1'. The query request includes the wireless access point identifying information and the access point assistant information of the first wireless access point. For example, the query condition in the query request includes SSID, MAC, the position information, the adjacent access point information, and the adjacent base station information etc.

The first apparatus 11' of the network device 1' obtains the query request regarding the first wireless access point from user device 2 and conducts the matching based on the query request.

If the first apparatus 11' of the network device 1' obtains a plurality of second wireless access points having the same wireless access point identifying information as that of the first wireless access point, the fourth apparatus 14' of the network device 1' obtains the access point assistant information of the first wireless access point from the user device 2.

Next, the second apparatus 12' of the network device 1' determines whether the first wireless access point and the second wireless access point are the same according to the access point assistant information of the first wireless access point and the second wireless access point. For example, when there is the position information of the wireless access point, the position information of the first wireless access point is compared with that of the second wireless access point. For another example, when there is adjacent access point information or adjacent base station information, similarly, the adjacent access point information or the adjacent base station information of the first wireless access point can be compared with the second wireless access point. Finally, a unique second wireless access point which is the same as the first wireless access point is obtained.

Next, the third apparatus 13' of the network device 1' provides the second wireless access point which is the same as the first wireless access point to the user device 2;

Next, the sixth apparatus 26 of the user device 2 obtains the second wireless access point which is the same as the first wireless access point, and is determined based on the wireless access point identifying information and the access point assistant information and is sent by the network device 1'.

Moreover, in an actual scenario, if there is only one unique second wireless access point obtained when the first apparatus 11' tries to obtain the second wireless access point having the same wireless access point identifying information as that of the first wireless access point, the fourth apparatus 14' and the second apparatus 12' does not need to use the access point assistant information to conduct further matching. The third apparatus 13' can directly provide the second wireless access point which is the same as the first wireless access point to the user device 2.

The present application further provides a system for distinguishing homonymic wireless access points. The system includes the above network device and the above user device. Moreover, the system uses a method described with reference to FIG. 2, in which the network device 1' and the user device 2 cooperate to distinguish homonymic wireless access points.

Figure 3:
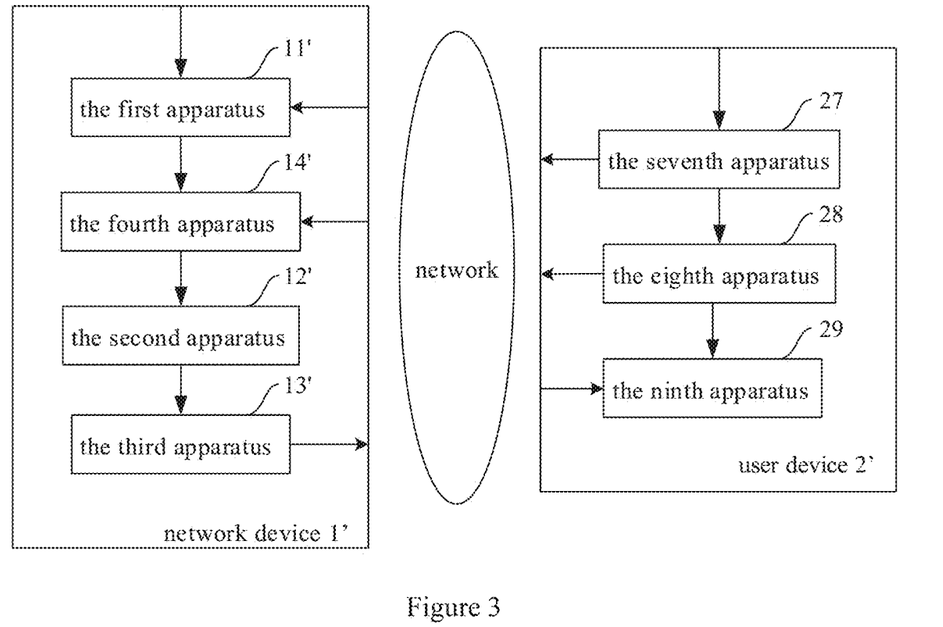
FIG. 3 shows a schematic diagram of the cooperation of a network device and a user device for distinguishing homonymic wireless access points provided according to another preferred embodiment of the present application.

FIG. 3 shows a schematic diagram of the cooperation of a network device and a user device for distinguishing homonymic wireless access points provided according to one preferred embodiment of the present application.

The content of network device 1' is the same or substantially the same as that of network device 1' shown in FIG. 2.

For the sake of simplicity, the details are not recited here, which is included herein merely by reference.

The user device 2' includes the seventh apparatus 27, the eighth apparatus 28, and the ninth apparatus 29.

The seventh apparatus 27 is used to send the query request regarding the first wireless access point to the network device. The query request includes the wireless access point identifying information of the first wireless access point. The eighth apparatus 28 is used to send the access point assistant information of the first wireless access point to the network device based on the obtainment of information of a plurality of second wireless access points having the same wireless access point identifying information as that of the first wireless access point by the network device. The ninth apparatus 29 is used to obtain the second wireless access point which is the same as the first wireless access point, and is determined based on the wireless access point identifying information and the access point assistant information, and is sent by the network device.

The cooperation of the network device 1' and the user device 2' is as below:

The seventh apparatus 27 of the user device 2' sends the query request regarding the first wireless access point to network device 1'. The query request includes the wireless access point identifying information of the first wireless access point. For example, the query condition in the query request includes SSID and MAC.

The first apparatus 11' of the network device 1' obtains the query request regarding the first wireless access point from user device 2 and conducts the matching based on the query request.

If the first apparatus 11' of the network device 1' obtains a plurality of second wireless access points having the same wireless access point identifying information as that of the first wireless access point, the information of a plurality of second wireless access points is sent to the eighth apparatus 28 of the user device 2'.

The eighth apparatus 28 sends the access point assistant information of the first wireless access point to the network device based on the obtainment of information of a plurality of second wireless access points having the same wireless access point identifying information as that of the first wireless access point by the network device.

Next, the fourth apparatus 14' of the network device 1' obtains the access point assistant information of the first wireless access point from the user device 2'.

Next, the second apparatus 12' of the network device 1' determines whether the first wireless access point and the second wireless access point are the same according to the access point assistant information of the first wireless access point and the second wireless access point. For example, when there is the position information of the wireless access point, the position information of the first wireless access point is compared with that of the second wireless access point. For another example, when there is the adjacent access point information or the adjacent base station information, similarly, the adjacent access point information or the adjacent base station information of the first wireless access point can be compared with the second wireless access point. Finally, a unique second wireless access point which is the same as the first wireless access point is obtained.

Next, the third apparatus 13' of the network device 1' provides the second wireless access point which is the same as the first wireless access point to the user device 2'.

Next, the ninth apparatus 29 of the user device 2' obtains the second wireless access point which is the same as the first wireless access point, and is determined based on the wireless access point identifying information and the access point assistant information, and is sent by the network device 1'.

Moreover, in an actual scenario, if there is only one unique second wireless access point obtained when the first apparatus 11' tries to obtain the second wireless access point having the same wireless access point identifying information as that of the first wireless access point, the fourth apparatus 14' and the second apparatus 12' do not need to use the access point assistant information to conduct further matching. The third apparatus 13' can directly provide the second wireless access point which is the same as the first wireless access point to the user device 2.

The present application further provides a system for distinguishing homonymic wireless access points. The system includes the above network device and the above user device. Moreover, the system uses a method described with reference to FIG. 3, in which the network device 1' and the user device 2' cooperate to distinguish homonymic wireless access points.

Figure 4:
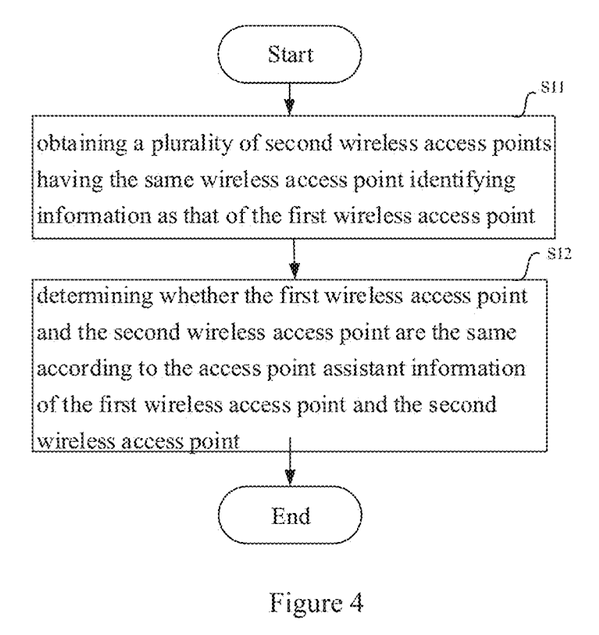
FIG. 4 shows a method for distinguishing homonymic wireless access points at the network device end provided according to one aspect of the present application.

FIG. 4 shows a method for distinguishing homonymic wireless access points at the network device end provided according to one aspect of the present application, wherein the method includes step S12 and step S12.

The step S11 includes obtaining a plurality of second wireless access points having the same wireless access point identifying information as that of the first wireless access point. The step S12 includes determining whether the first wireless access point and the second wireless access point are the same, according to the access point assistant information of the first wireless access point and the second wireless access point.

Here, the wireless access point identifying information includes the Service Set Identifier and/or the Media Access Control address of the wireless access point. The wireless access point identifying information may be obtained from the network LAN service list of the user device. The specific obtaining manner can be the method which is well known by a person of ordinary skill in the art, of which the details are not recited here.

Preferably, the access point assistant information includes at least one item selected from the group consisting of the position information of the wireless access point, the adjacent access point information of the wireless access point, and the adjacent base station information of the wireless access point.

In the step S12, whether the first wireless access point and the second wireless access point are the same is determined according to the access point assistant information of the first wireless access point and the second wireless access point.

In an embodiment, the access point assistant information includes the position information of the wireless access point. In step S12, whether the first wireless access point and the second wireless access point have the same position information is determined. When the first wireless access point and the second wireless access point have the same position information, the second apparatus 12 determines that the first wireless access point and the second wireless access point are the same. Here, since the obtained position information has errors, when the position information of the first wireless access point and the second wireless access point is within the allowed error range, the second apparatus 12 may determine that the first wireless access point and the second wireless access point are the same. Moreover, the error may be set specifically according to the actual precision of the device and different scenarios, and the details are not recited here.

In another embodiment, the access point assistant information includes the adjacent base station information of the wireless access point. In step S12, whether the first wireless access point and the second wireless access point have the same adjacent base station information is determined. When the first wireless access point and the second wireless access point have the same adjacent base station information, the second apparatus 12 determines that the first wireless access point and the second wireless access point are the same.

In yet another embodiment, the access point assistant information includes the adjacent access point information of the wireless access point. When the matching information of the adjacent access point information of the first wireless access point and the adjacent access point information of the second wireless access point is equal to or more than agreed matching threshold information, in step S12, it is determined that the first wireless access point and the second wireless access point are the same.

Figure 5:
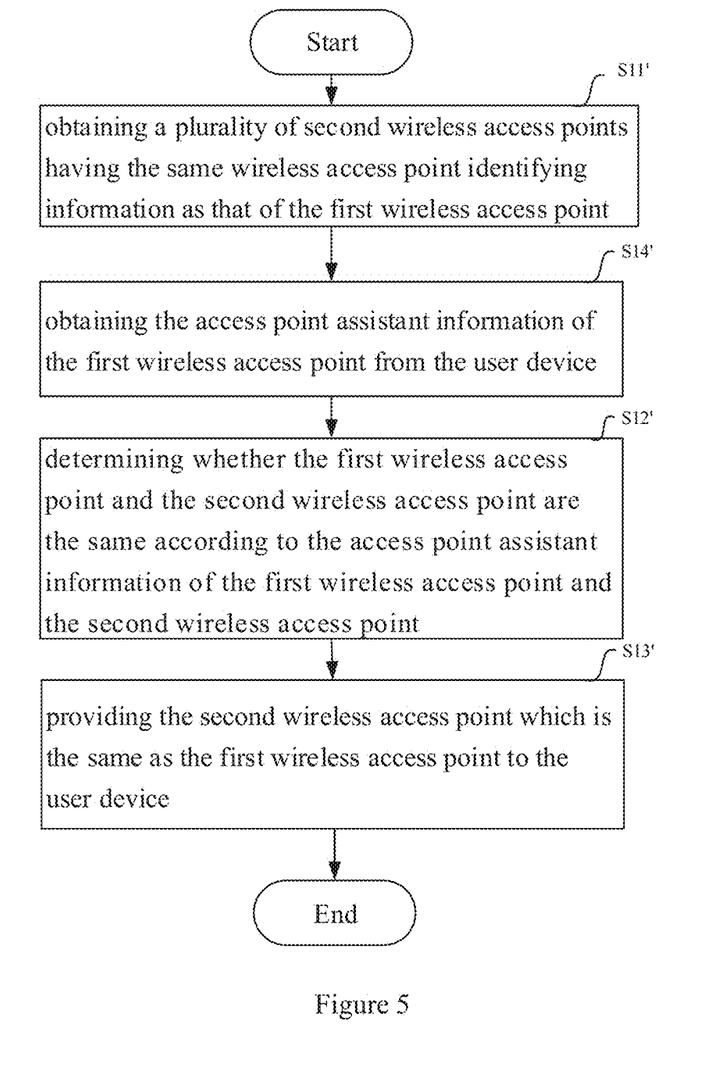
FIG. 5 shows a method for distinguishing homonymic wireless access points at the network device end schematic diagram provided according to one preferred embodiment of the present application.

FIG. 5 shows a schematic diagram of a method for distinguishing homonymic wireless access points at the network device end provided according to a preferred embodiment of the present application. The method includes step S11', step S12', step S13', and step S14'.

On the basis of the content of step S11 shown in FIG. 4, in the step 11', the query request regarding the first wireless access point is obtained. Moreover, a plurality of second wireless access points having the same wireless access point identifying information as that of the first wireless access point is obtained based on the query request.

In the step S14', the assistant information of the first wireless access point is obtained from the user device.

The content of step S12' is the same or substantially the same as the step S12 shown in FIG. 4. For the sake of simplicity, the details are not recited here, which is included herein merely by reference.

In the step S13', the second wireless access point which is the same as the first wireless access point to the user device is provided.

Figure 6:
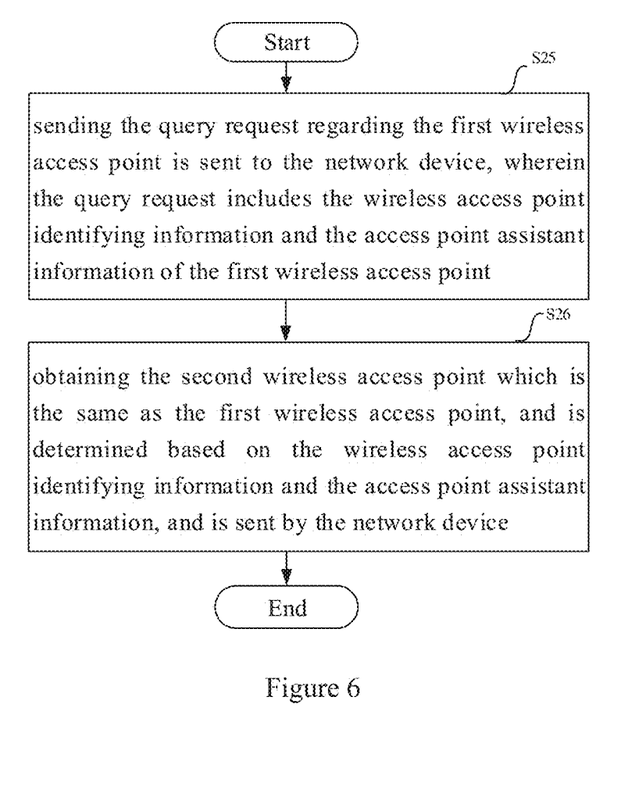
FIG. 6 shows a schematic diagram of a method for distinguishing homonymic wireless access points at the user device end provided according to one preferred embodiment of the present application.

FIG. 6 shows a schematic diagram of a method for distinguishing homonymic wireless access points at the user device end provided according to a preferred embodiment of the present application. The method includes step S25 and step S26.

The step 25 includes sending the query request regarding the first wireless access point to the network device. The query request includes the wireless access point identifying information and the access point assistant information of the first wireless access point. The step 26 includes obtaining the second wireless access point which is the same as the first wireless access point, and is determined based on the wireless access point identifying information and the access point assistant information and is sent by the network device.

Figure 7:
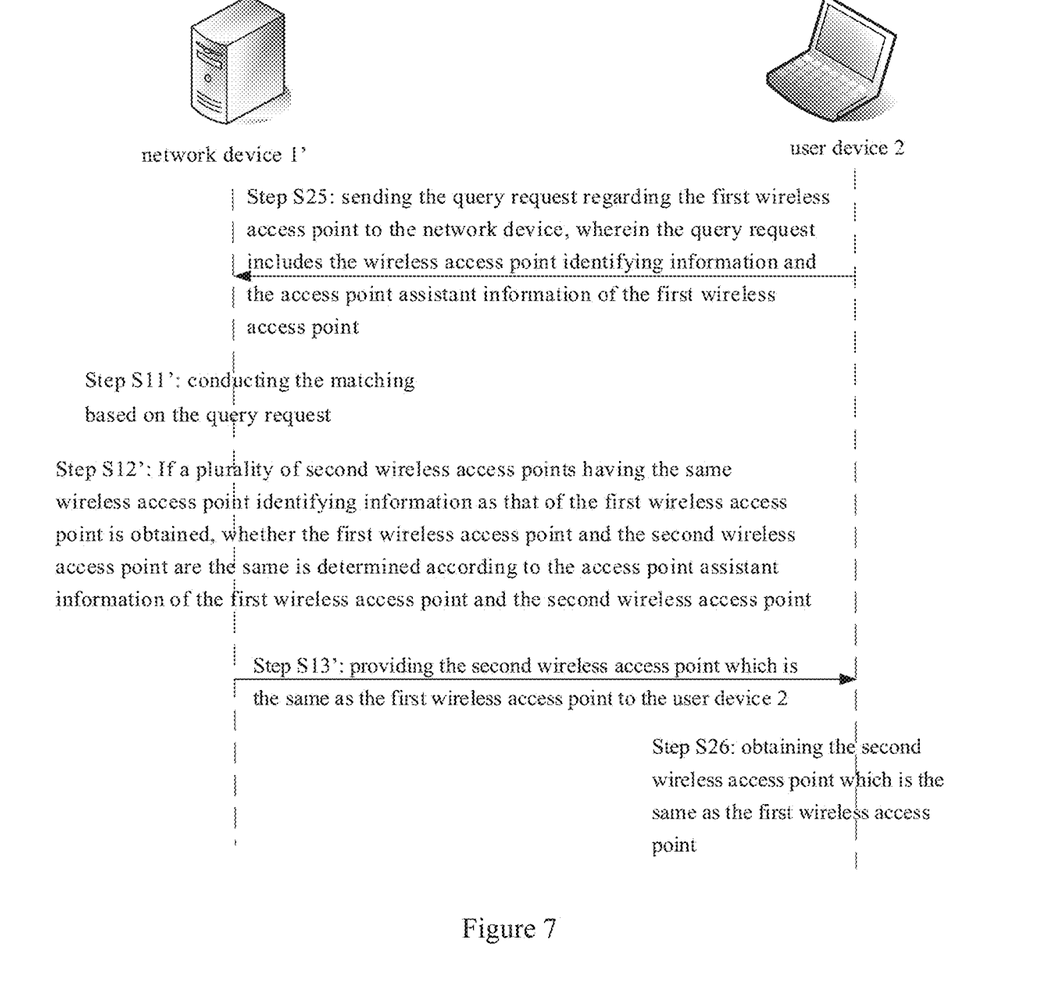
FIG. 7 shows a schematic diagram of a cooperation method of a network device and a user device for distinguishing homonymic wireless access points provided according to one preferred embodiment of the present application.

FIG. 7 shows a schematic diagram of a cooperation method of a network device and a user device for distinguishing homonymic wireless access points provided according to a preferred embodiment of the present application. With reference to FIG. 5 and FIG. 6, the procedure of the cooperative working of the network device 1' and the user device 2 is as below:

Step S25: the user device 2 sends the query request regarding the first wireless access point to network device 1'. The query request includes the wireless access point identifying information and the access point assistant information of the first wireless access point. For example, the query condition in the query request includes SSID, MAC, the position information, the adjacent access point information, and the adjacent base station information etc.

Step S11': the network device 1' obtains the query request regarding the first wireless access point from user device 2, and conducts the matching based on the query request;

Step S12': when the first apparatus 11' of the network device 1' obtains a plurality of second wireless access points having the same wireless access point identifying information as that of the first wireless access point, the network device 1' determines whether the first wireless access point and the second wireless access point are the same according to the access point assistant information of the first wireless access point and the second wireless access point. For example, when there is the position information of the wireless access point, the position information of the first wireless access point is compared with that of the second wireless access point. For another example, when there is adjacent access point information or adjacent base station information, similarly, the adjacent access point information or adjacent base station information of the first wireless access point can be compared with that of the second wireless access point. Finally, a unique second wireless access point which is the same as the first wireless access point is obtained.

Step S13': the network device 1' provides the second wireless access point which is the same as the first wireless access point to the user device 2.

Step S26: the user device 2 obtains the second wireless access point which is the same as the first wireless access point, and is determined based on the wireless access point identifying information and the access point assistant information, and is sent by the network device 1'.

Moreover, in an actual scenario, if there is only one unique second wireless access point obtained when the network device 1' tries to obtain the second wireless access point having the same wireless access point identifying information as that of the first wireless access point, the network device 1' does not need to use the access point assistant information to conduct further matching. The network device 1' can directly provide the second wireless access point which is the same as the first wireless access point to the user device 2.

Figure 8:
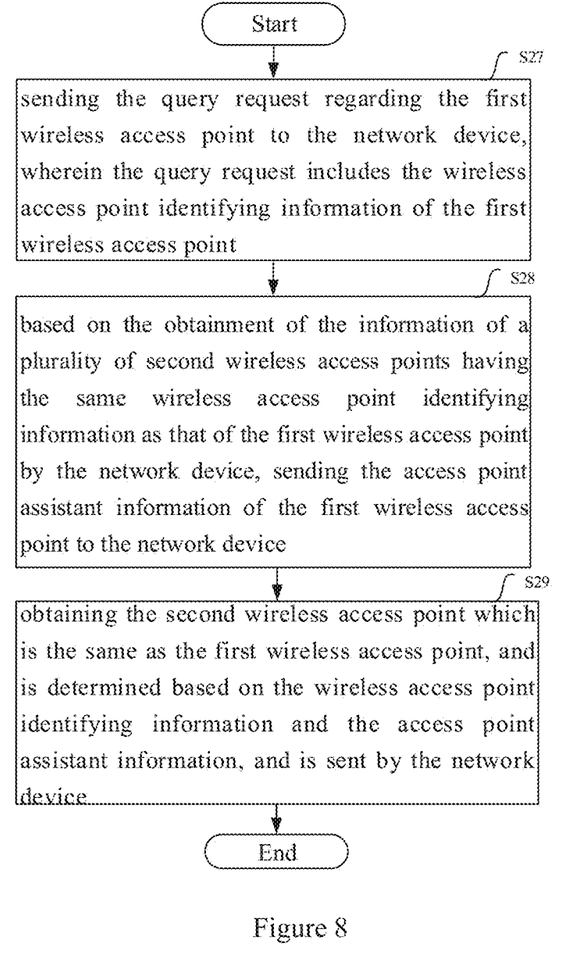
FIG. 8 shows a schematic diagram of a method for distinguishing homonymic wireless access points at the user device end provided according to one preferred embodiment of the present application.

FIG. 8 shows a schematic diagram of a method for distinguishing homonymic wireless access points at the user device end provided according to one preferred embodiment of the present application. The method includes: step S27, step S28, and step S29.

The step S27 includes sending the query request regarding the first wireless access point to the network device. The query request includes the wireless access point identifying information of the first wireless access point. The step S28 includes sending the access point assistant information of the first wireless access point to the network device based on the obtainment of information of a plurality of second wireless access points having the same wireless access point identifying information as that of the first wireless access point by the network device. The step S29 includes obtaining the second wireless access point which is the same as the first wireless access point, and is determined based on the wireless access point identifying information and the access point assistant information, and is sent by the network device.

Figure 9:
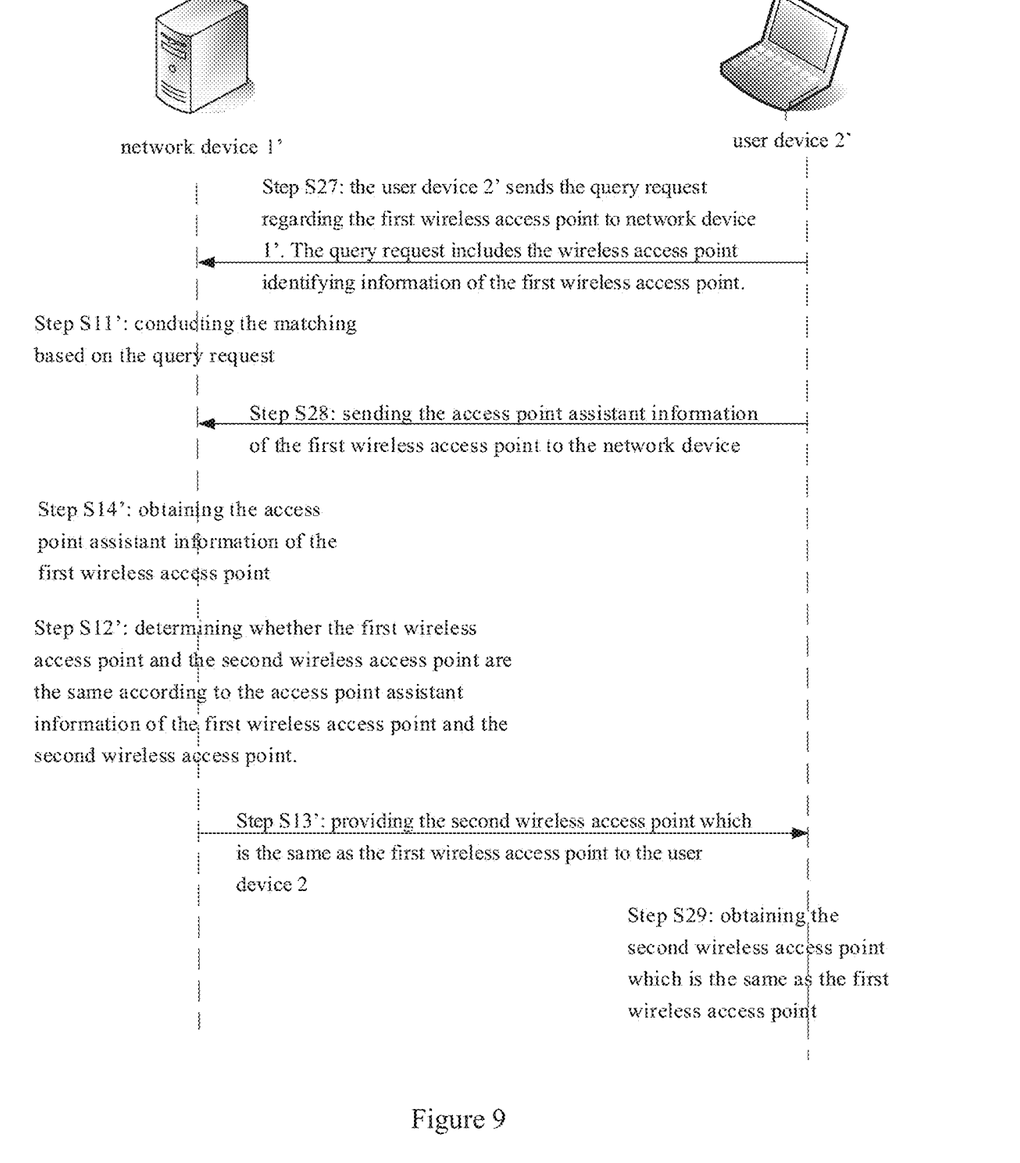
FIG. 9 shows a schematic diagram of a cooperation method of a network device and a user device for distinguishing homonymic wireless access points provided according to another preferred embodiment of the present application.

FIG. 9 shows a schematic diagram of a cooperation method of a network device and a user device for distinguishing homonymic wireless access points provided according to another preferred embodiment of the present application. With reference to FIG. 5 and FIG. 8, the cooperative procedure of the network device and the user device is as below:

Step S27: the user device 2' sends the query request regarding the first wireless access point to network device 1'. The query request includes the wireless access point identifying information of the first wireless access point. For example, the query condition in the query request includes SSID and MAC.

Step S11': the network device 1' obtains the query request regarding the first wireless access point from user device 2 and conducts the matching based on the query request. If a plurality of second wireless access points having the same wireless access point identifying information as that of the first wireless access point are obtained by the network device 1', the network device 1' obtains the access point assistant information of the first wireless access point from the user device 2'.

Step S28: based on the obtainment of information of a plurality of second wireless access points having the same wireless access point identifying information as that of the first wireless access point by the network device, the access point assistant information of the first wireless access point is sent to the network device. The access point assistant information includes the position information, the adjacent access point information, and the adjacent base station information, etc.

Step S14': the network device 1' obtains the access point assistant information of the first wireless access point from the user device 2'.

Step S12': the network device 1' determines whether the first wireless access point and the second wireless access point are the same according to the access point assistant information of the first wireless access point and the second wireless access point. For example, when there is the position information of the wireless access point, the position information of the first wireless access point is compared with that of the second wireless access point. For another example, when there is adjacent access point information or adjacent base station information, similarly, the adjacent access point information or the adjacent base station information of the first wireless access point can be compared with that of the second wireless access point. Finally, a unique second wireless access point which is the same as the first wireless access point is obtained.

Step S13': the network device 1' provides the second wireless access point which is the same as the first wireless access point to the user device 2'.

Step S29: the user device 2' obtains the second wireless access point which is the same as the first wireless access point, and is determined based on the wireless access point identifying information and the access point assistant information, and is sent by the network device 1'.

Moreover, in an actual scenario, if there is only one unique second wireless access point obtained when the network device 1' tries to obtain the second wireless access point having the same wireless access point identifying information as that of the first wireless access point, the network device 1' does not need to use the access point assistant information to conduct further matching. The network device 1' can directly provide the second wireless access point which is the same as the first wireless access point to the user device 2'.

Compared with the prior art, the method and equipment of the present application compares the access point assistant information of the first wireless access point and the second wireless access point which are homonymic, including using the position information of the wireless access point, the adjacent base station information, or the adjacent access point information, etc. The homonymic wireless access points are further distinguished. Thus, the information of wireless access point is accurately described.

In a typical configuration of the present application, each of a terminal, a device of the service network, and a credible square includes one or more processors (CPU), input/output interfaces, network interfaces, and memories. The memory can include different forms of computer readable medium including volatile memory, random access memory (RAM), and/or nonvolatile memory etc., for example, Read Only Memory (ROM) or flash memory (flash RAM). The memory is an example of the computer-readable medium. The computer-readable medium includes nonvolatile and volatile, portable and nonportable medium, which can achieve the information storage by any method or technology. The information can be computer readable instruction, data structure, program modules, or other data. Examples of the storage medium of the computer include, but are not limited to, Phase Change Memory (PRAM), static random access memory (SRAM), dynamic random access memory (DRAM), other types of Random Access Memory (RAM), Read Only Memory (ROM), Electrically Erasable Programmable Read Only Memory (EEPROM), flash memory or other memory technology, Compact Disc Read Only Memory (CD-ROM), Digital Versatile Disc (DVD) or other optical storage, magnetic cassette tape, magnetic tape disk storage or other magnetic store device or any other non-transmission medium, that can be used to store the information which can be accessed by the computing device. According to the definition herein, the computer readable medium does not include the non-transitory computer-readable medium (transitory media), for example, modulated data signal and carrier wave.

It should be noted that the present application can be implemented in a combination of software and/or software and hardware. For example, the present application can be achieved by an application-specific integrated circuit (ASIC), a general-purpose computer, or any other similar hardware device. In one embodiment, the software program of the present application can be performed by the processor to achieve the above steps or functions. Similarly, the software program (including related data structure) of the present application may be stored in the computer-readable recording medium, for example, RAM storage, magnetic or optical driver or floppy disk and similar device. Additionally, some steps or functions of the present application can be achieved by hardware, for example, a circuit which cooperates with the processor so as to perform each step or function.

Additionally, a part of the present application can be applied as a computer program product, for example, computer program instructions, which, when executed by a computer, through the operation of this computer, may invoke or provide the method and/or technical solution according to the present application. Moreover, program instructions of the method of the present application to be invoked can be stored in fixed or portable recording medium, and/or can be transferred through broadcasting or data stream in other signal-carrying media, and/or is stored in the storage of a computing device running according to the program instruction. Here, one embodiment according to the present application includes one apparatus. The apparatus includes a storage which is used to store computer program instructions and a processor which is used to perform program instructions. When the computer program instruction is performed by the processor, the apparatus is triggered to run the above method and/or technical solution based on a plurality of embodiments according to the present application.

For a person of ordinary skill in the art, apparently, the present application is not limited to details of the above exemplary embodiment. Moreover, without departing from the spirit or substantial features of the present application, the present application can be achieved by other specific forms. Thus, in any case, the embodiments should always be deemed as exemplary and are non-restrictive. The scope of the present application is defined by the accompanying claims rather than the above descriptions. Thus, the aim is to include all the variations falling within the meaning and the scope of equivalent elements of the claims in the present application. Any reference number in the claims should not be deemed as limiting the related claim. Moreover, apparently, the term "include" does not exclude any other unit or step. Singular does not exclude plural. A plurality of units or apparatus stated in an apparatus claim can also be achieved by one unit or apparatus through software or hardware. The words "first", "second", etc. are used to indicate the name, rather than indicating any specific sequence.

What is claimed is:

1. A method for distinguishing homonymic wireless access points at a network device end, wherein the method comprises:
    obtaining a plurality of second wireless access points having same wireless access point identifying information as that of a first wireless access point; and
    determining whether the first wireless access point and the second wireless access point are the same according to access point assistant information of the first wireless access point and the second wireless access point;
    wherein the access point assistant information includes adjacent access point information of the wireless access point;
    wherein the step of determining whether the first wireless access point and the second wireless access point are the same according to the access point assistant information of the first wireless access point and the second wireless access point includes
    when the adjacent access point information of the first wireless access point and the adjacent access point information of the second wireless access point are equal to or more than an allowed error range, determining that the first wireless access point and the second wireless access point are the same.

2. The method according to claim 1, wherein the access point assistant information further includes position information of the wireless access point or adjacent base station information of the wireless access point;
    wherein the step of determining whether the first wireless access point and the second wireless access point are the same according to the access point assistant information of the first wireless access point and the second wireless access point includes:
    when the first wireless access point and the second wireless access point have the same position information or the adjacent base station information, determining that the first wireless access point and the second wireless access point are the same.

3. The method according to claim 1, wherein the step of obtaining the plurality of second wireless access points having the same wireless access point identifying information as that of the first wireless access point includes
    obtaining a query request regarding the first wireless access point from a user device;
    based on the query request, obtaining the plurality of second wireless access points having the same wireless access point identifying information as that of the first wireless access point;
    wherein the method further includes:
    providing the second wireless access point which is the same as the first wireless access point to the user device.

4. The method according to claim 3, wherein the method further includes
    obtaining the access point assistant information of the first wireless access point from the user device.

5. The method according to claim 1, wherein the wireless access point identifying information includes
    a Service Set Identifier and/or a Media Access Control address of the wireless access point.

* * * * *